United States Patent [19]

Müller et al.

[11] 4,428,969

[45] Jan. 31, 1984

[54] PROCESS FOR THE EXTRACTION OF DATE FRUITS

[75] Inventors: Hans Müller, Erlenbach; Rudolf Gayler, Zürich; Nikolas Rapsomanikis, Männedorf, all of Switzerland

[73] Assignee: Chemap AG, Maennedorf, Switzerland

[21] Appl. No.: 970,125

[22] Filed: Dec. 11, 1978

[30] Foreign Application Priority Data

Jan. 3, 1978 [CH] Switzerland ............................. 24/78

[51] Int. Cl.³ ................................................ A23K 1/14
[52] U.S. Cl. ....................................... 426/53; 127/43; 127/55; 426/489; 426/518; 426/519
[58] Field of Search ............... 426/489, 478, 53, 518, 426/519; 210/500 R, 75; 127/55, 43

[56] References Cited

U.S. PATENT DOCUMENTS

| 228,004 | 5/1880 | Tunbridge | 210/500 R X |
| 455,675 | 7/1891 | Weinrich | 210/500 R X |
| 1,302,814 | 5/1919 | Kuryla | 426/489 X |
| 2,382,407 | 8/1945 | Erickson et al. | 426/489 X |
| 3,083,104 | 3/1963 | Celmer | 426/489 X |
| 3,301,684 | 1/1967 | Bosy | 426/489 X |
| 4,011,806 | 3/1977 | Kimura | 426/53 |

FOREIGN PATENT DOCUMENTS

| 1814274 | 6/1972 | Fed. Rep. of Germany | 426/489 |
| 2351641 | 5/1974 | Fed. Rep. of Germany | 127/43 |

*Primary Examiner*—William F. Smith
*Attorney, Agent, or Firm*—Michael J. Striker

[57] ABSTRACT

Date fruits are extracted by a wet grinding operation after addition of water and subsequent filtration of the homogenized product with the aid of a cellulosic filter aid. The date pits may be used as the filter aid. A fermentation may be carried out before the filtration. A high concentrate feed material is thus obtained.

8 Claims, No Drawings

PROCESS FOR THE EXTRACTION OF DATE FRUITS

BACKGROUND OF THE INVENTION

The invention relates to a process for the extraction of date fruits.

The extraction of dates which contain about 50% sugar, mainly invert sugar, and the further processing of the extract to obtain a date syrup, date sugar, yeast, etc. is known. Thus, in the German published application No. 2,459,407, a process is described for the extraction of date fruits wherein the dates are dried prior to the treatment to a water content of at most 15% and are subsequently cut lengthwise together with the pit whereupon the thus formed shreds or chips are subjected to the extraction. The cell structure of the dates is thus preserved during the diffusion.

The published application of the German Federal Republic No. 2,459,353 also described a process wherein the dates are comminuted into sharply defined shreds. By means of the extraction a thin juice is obtained which is filtered in a settling filter upon addition of the conventional filter aids such as kieselguhr or pearlite. The date pulp obtained by pressing the filter residue is then dried. A clear filtration of the date slurry, however, was considered not possible heretofore.

It is therefore an object of the present invention to provide a process in which date fruits are extracted in a manner that the use of the resulting filter cake as a feed or feed additive is possible without the undesirable action of inorganic filter aids.

SUMMARY OF THE INVENTION

This problem is met by subjecting the whole dates after addition of water, to a wet grinding and then after homogenizing the mixture to filter the mass upon addition of cellulosic filter aids.

The wet grind can be carried out also and preferentially after pitting the dates instead of proceeding from the whole fruit.

As filter aid a pulverulent cellulose may be used. It is, however, also possible to use the cellulose containing material of dried date palm leaves. Also, ground and dried date pits may be used as filter aids.

EXAMPLE 100 kg of pitted dates were suspended in 400 liter of water and were comminuted and homogenized in a wet grinding at a temperature of 50° to 60° C. The homogenized mass was then mixed with 5 to 8 kg of pulverulent cellulose and was filtered, for instance in a revolving filter. The residue was subjected to a pressing operation for further dehydration.

The throughput performance of the filter was about 800 to 1000 liter per m² an hour. The thus purified sugar solution was bleached and concentrated. Depending on the quality of the dates 60 to 80 kg of highly concentrated date syrup were obtained.

The residue of the filtration was subjected to direct drying or was first mixed with ground date pits followed by the drying step. It constitutes an excellent feed additive.

Instead of the above-mentioned filter aids ground date pits could also have been used as previously indicated.

The cellulose-containing feed additive is well digested by ruminants which have a cellulose degrading enzyme system.

The use of ground date pits instead of the cellulose as filter aid results also in a useful outlet for the entire date substance without the necessity of adding any foreign material.

The date syrup can then further be processed to form a sugar or, after a conventional purification, can be subjected to a fermentation. It is, however, also possible to subject the entire date fruit, after comminution and homogenization to a direct fermentation.

The ferment can then be separated with cellulose or ground date pits for use as filter aid after further drying. In this manner a feed can be obtained which is high concentrated and enriched with yeast protein.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Method of processing dates for extracting sweetening ingredient therefrom which comprises adding water to the dates to be processed, comminuting and homogenizing the date-water mixture, admixing the resultant date-water homogenizate with a cellulose containing material, filter aid subjecting the resultant admixture to filtration and recovering the extracted sweetening ingredient as filtrate.

2. Method according to claim 1 which comprises separately recovering the date-cellulose containing material remaining after the filtration for use as an animal feed.

3. Method according to claim 1 wherein said cellulose containing material is a member selected from the group consisting of cellulose, date palm leaves, wood flour and ground date pits.

4. Method according to claim 1 wherein said cellulose containing material is cellulose.

5. Method according to claim 1 wherein said cellulose containing material is ground date pits.

6. Method according to claim 1 which comprises adding a yeast to said admixture of homogenized dates and water, allowing fermentation to take place, adding a cellulose containing filter aid, then subjecting the fermented mixture to filtration and recovering the extracted sweetening ingredient as filtrate and the date-cellulose-yeast material for use as an animal feed.

7. Method of processing dates for extracting sweetening ingredient therefrom which comprises adding water to the dates to be processed comminuting and homogenizing the date-water mixture with a cellulose containing material filter and, subjecting the resultant comminuted homogenizate to filtration and recovering the extracted sweetening ingredient as filtrate.

8. Method according to claim 7 wherein said cellulose containing material is the date pits.

* * * * *